United States Patent [19]
Maruyama et al.

[11] 3,919,063
[45] Nov. 11, 1975

[54] ELECTRON-BEAM RADIATION-CURING METHOD OF UNSATURATED POLYESTERS DERIVED FROM ENDOMETHYLENE TETRAHYDROPHTHALIC ACID

[75] Inventors: Tsutomu Maruyama; Koichiro Murata, both of Hiratsuka, Japan

[73] Assignee: Kansai Paint Company, Ltd., Japan

[22] Filed: Apr. 24, 1974

[21] Appl. No.: 463,725

Related U.S. Application Data

[63] Continuation-in-part of Ser. No. 259,632, June 5, 1972, abandoned.

[30] Foreign Application Priority Data

June 9, 1971 Japan .............................. 46-41313

[52] U.S. Cl. ... 204/159.15; 204/159.19; 260/22 CB; 260/40; 260/75 R; 260/75 UA; 260/28.5 R; 260/861; 260/863; 260/871; 260/872; 427/44; 427/54; 428/458; 428/482; 428/483
[51] Int. Cl.² C08F 8/00; C08G 18/00; C08L 67/06
[58] Field of Search ........ 260/75 UA; 871, 872, 861; 204/159.15, 159.19

[56] References Cited
UNITED STATES PATENTS

| | | | |
|---|---|---|---|
| 3,662,025 | 5/1972 | Buck | 260/74 UA |
| 3,674,727 | 7/1972 | Fekete et al. | 260/75 UA |
| 3,699,022 | 10/1972 | Behrens et al. | 204/159.15 |

FOREIGN PATENTS OR APPLICATIONS

| | | | |
|---|---|---|---|
| 1,087,403 | 10/1967 | United Kingdom | 204/159.23 |

*Primary Examiner*—Richard B. Turer
*Attorney, Agent, or Firm*—Larson, Taylor and Hinds

[57] ABSTRACT

A method for curing unsaturated polyester compositions which comprises applying electron-beam at a total dose of 0.5 to 50 Mrad and a dose rate of 0.1 to 30 Mrad per second to an unsaturated polyester composition comprising a vinyl monomer and unsaturated polyester dissolved therein, said vinyl monomer being a mixture of 40 to 70 weight percent of at least one of acrylic and methacrylic monomers and 30 to 60 weight percent of at least one of styrene and vinyl toluene, and said unsaturated polyester having an acid value of 4 to 11 and being a condensation product of 1.0 mole of a dicarboxylic acid and 1.0 to 1.2 moles of a polyhydric alcohol, and said dicarboxylic acid being a mixture of (a) 30 to 45 mole percent of at least one of endo-cis-bicyclo-(2,2,1)-5-heptene-2,3-dicarboxylic acid and anhydride thereof, (b) 20 to 40 mole percent of at least one of unsaturated dicarboxylic acids and anhydrides thereof and (c) 15 to 55 mole percent of at least one of aromatic dicarboxylic acids, saturated aliphatic dicarboxylic acids and anhydrides thereof.

11 Claims, No Drawings

ELECTRON-BEAM RADIATION-CURING METHOD OF UNSATURATED POLYESTERS DERIVED FROM ENDOMETHYLENE TETRAHYDROPHTHALIC ACID

The present application is a continuation-in-part of our copending application Ser. No. 259,632, filed June 5, 1972, and now abandoned.

This invention relates to a curing method of an unsaturated polyester, more paticularly to a method for curing an unsaturated polyester by irradiating the same with electron beam.

Unsaturated polyester resins of various kinds are known in the art and have been extensively used in various fields. However, unsaturated polyester resins conventional in the art have drawbacks of having extremely poor weather resistance, so that they are not applicable to outdoor uses but only to indoor uses. Particularly, such drawbacks are material when unsaturated polyesters are used for coating compositions.

For example, it is known in the art to produce a coating film of an unsaturated polyester resin by application of heat or light to a coating composition which contains an unsaturated polyester prepared by reacting a polyhydric alcohol with an acid mixture of endo-cis-bicyclo-(2,2,1)-5-heptene-2,3-dicarboxylic acid, unsaturated dibasic acid and saturated dibasic acid. U.S. Pat. No. 3,674,727 discloses an unsaturated polyester comprising the above mentioned acid reactants. However, the coating film thereby obtained is poor in weather resistance and, therefore, such coating method is applicable only to indoor uses. It is also proposed to provide a coating film of an unsaturated polyester resin by applying an ionizing radiation to a coating composition which contains an unsaturated polyester prepared by reacting a polyhydric alcohol with tetrahydrophalic acid and an unsaturated dibasic acid. However, the resultant coating film also exhibits only poor weather resistance.

Various attempts have been made to improve weather resistance of unsaturated polyester resins, but no successful methods have been proposed yet as far as we are aware.

An object of the invention is to provide a method for producing unsaturated polyester resin exhibiting excellent weather resistance and applicable not only in indoor uses but also in outdoor uses.

Another object of the invention is to provide a method, which makes it possible to obtain a coating film of an unsaturated polyester resin having excellent weather resistance.

Another object of the invention is to provide an unsaturated polyester composition useful for coating and capable of producing a coating film having excellent weather resistance by irradiation of electron beam thereto.

These and other objects of the invention will be apparent from the following description.

A method for curing unsaturated polyester compositions according to the present invention comprises applying electron-beam at a total dose of 0.5 to 50 Mrad and a dose rate of 0.1 to 30 Mrad per second to an unsaturated polyester composition comprising a vinyl monomer and unsaturated polyester dissolved therein, said vinyl monomer being a mixture of 40 to 70 weight percent of at least one of acrylic and methacrylic monomers and 30 to 60 weight percent of at least one of styrene and vinyl toluene, and said unsaturated polyester having an acid value of 4 to 11 and being a condensation product of 1.0 mole of a dicarboxylic acid and 1.0 to 1.2 moles of a polyhydric alcohol, and said dicarboxylic acid being a mixture of (a) 30 to 45 mole percent of at least one of endo-cis-bicyclo-(2,2,1)-5-heptene-2,3-dicarboxylic acid and anhydride thereof, (b) 20 to 40 mole percent of at least one of unsaturated dicarboxylic acids and anhydrides thereof and (c) 15 to 55 mole percent of at least one of aromatic dicarboxylic acids, saturated aliphatic dicarboxylic acids and anhydrides thereof.

According to the researches of the present inventors it has been found that when said unsaturated polyester composition containing the above specific unsaturated polyester dissolved in the above particular vinyl monomer mixture is subjected to irradiation with electron beam the resultant unsaturated polyester resin thus cured displays a highly excellent weather resistance. In fact the unsaturated polyester resin cured by the method of the invention exhibits substantially no deterioration in the properties thereof even after weathering tests conducted for such a long period of more than 30 months. Thus, according to the present invention it is possible to apply unsaturated polyester resin not only to indoor uses but also to outdoor uses. The specific unsaturated polyester composition used in the invention, moreover, has excellent surface curability to produce a coating film having excellent weather resistance in a short period of curing time when electron beam is applied thereto. Therefore, the method of the invention is particularly suitable for producing a coating film, though it is applicable to the production of other various polyester resin products, such as shaped products, lamination products and the like.

It is not clear why the present composition has excellent surface curability, but it is presumed that the hydrogen in endomethylene group contained in endo-cis-bicyclo-(2,2,1)-5-heptene-2,3-dicarboxylic acid or its anhydride is stripped off by irradiation with electron beam to allow the endomethylene group to combine with oxygen in the air, giving high surface curability. Likewise, it is not apparent why the present method gives a cured product which is much superior in weather resistance to one obtained from the conventional unsaturated polyester composition, but presumably this will be attributable to the fact that the carbon-carbon double bond of endo-cis-bicyclo-(2,2,1)-5-heptene-2,3-dicarboxylic acid or its anhydride present in the unsaturated polyester resin, which hardly participate in cross linking reaction under the action of light or catalyst, are caused to participate in cross linking reaction by the intense energy of electron beam, with the result that only a very few carbon-carbon double bonds remain in the resin.

The unsaturated polyester composition used in this invention is prepared by dissolving the above-mentioned specific unsaturated polyester in a monomer mixture consisting of 40 to 70% by weight of at least one of acrylic monomers and methacrylic monomers and 60 to 30% by weight of at least one of styrene and vinyl toluene.

Employable as the acrylic monomer and methacrylic monomer according to this invention are monomers represented by the formula of

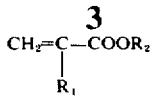

wherein $R_1$ is hydrogen atom or methyl group and $R_2$ is hydrogen atom, 2-hydroxyethyl, 2-hydroxypropyl group of alkyl group having 1 to 12 carbons, which may be used singly or at least two of which may be used in admixture. These monomers include, for example, acrylic acid, methyl acrylate, ethyl acrylate, butyl acrylate, 2-hydroxyethyl acrylate, 2-hydroxyethyl methacrylate, 2-hydroxypropyl acrylate, 2-hydroxypropyl methacrylate, 2-ethylhexyl acrylate, methacrylic acid, methyl methacrylate, ethyl methacrylate, butyl methacrylate, lauryl methacrylate, etc. Particularly, butyl acrylate is the most preferable. These monomers are mixed with at least one of styrene and vinyl toluene in the ratio by weight of 40 to 70 : 60 to 30. If the proportion of styrene and/or vinyl toluene exceeds 60% by weight, the resulting cured product will exhibit poor resistance to weather, whereas if it is lower than 30% by weight, the carbon-carbon double bond of the unsaturated dicarboxylic acid in the unsaturated polyester resin will remain in the cured product to deteriorate its resistance to weather. For these reasons, it is preferable to use the acrylic monomer and methacrylic monomer within the range of 40 to 70% by weight.

The acid components other than endo-asbicyclo-(2,2,1)-5-heptene-2,3-dicarboxylic acid or its anhydride used in preparing the unsaturated polyester of this invention, namely unsaturated dicarboxylic acids and aromatic or saturated aliphatic dicarboxylic acids, may preferably be those generally used. The unsaturated dicaboxylic acids include various aliphatic and cycloaliphatic unsaturated dicarboxylic acids other than endo-cis-bicyclo-(2,2,1)-5-heptene-2,3-dicarboxylic acid and its anhydride. Examples thereof are maleic acid, maleic anhydride, fumaric acid, mesaconic acid, citraconic acid, itaconic acid, tetrahydrophthalic acid, tetrahydrophthalic anhydride, etc., which can be used singly or in admixture. Examples of the aromatic dicarboxylic acids and the saturated aliphatic dicarboxylic acids are phthalic acid, pthalic anhydride, isophthalic acid, hexahydrophthalic acid, hexahydrophthalic anhydride, adipic acid, sebacic acid, succinic acid, succinic anhydride, etc., which can be used alone or in admixture with one another.

Employable as the polyhydric alcohol is dihydric alcohol, which can be used in admixture with trihydric alcohol. If a mixture of dihydric alcohol and trihydric alcohol is used, the mixing ratio may preferably be such that trihydric alcohol is not more than 20 mole %, based on the total moles of the dihydric alcohol and trihydric alcohol. The trihydric alcohol, if exceeding 20 mole % in amount, tends to gel during esterification reaction and there is a need to effect reaction at a lower temperature for a prolonged period of time, hence undesirable. Examples of the dihydric alcohol are ethylene glycol, propylene glycol, diethylene glycol, butylene glycol, hydrogenated bisphenol A, bisphenol dihydroxypropylether, neopentyl glycol, butane diol, hexane diol, etc., which can be used singly or in admixture. Further trihydric alcohol includes, for example, glycerin, trimethylol ethane, trimethylol propane, etc.

The esterification reaction of the acid components with the alcohol to obtain unsaturated polyester used in this invention can be carried out by known methods heretofore generally conducted.

The constituent proportions of (1) endo-cisbicyclo-(2,2,1)-5-heptene-2,3-dicarboxylic acid, (2) unsaturated dicarboxylic acid, and (3) aromatic dicarboxylic acid and/or saturated aliphatic dicarboxylic acid, nemaly the acid components for preparing the unsaturated polyester of this invention, are important, which must be in the ranges of 30 to 45 mole % for endo-cis-bicyclo-(2,2,1)-5-heptene-2,3-dicarboxylic acid, 20 to 40 mole % for unsaturated dicarboxylic acid, and 15 to 55 mole % for aromatic dicarboxylic acid and/or saturated aliphatic dicarboxylic acid. An amount of unsaturated dicarboxylic acid, if less than 20 mole %, lowers curing velocity and is not suitable for the electronn beam-curable composition intended for rapid curing, but an amount electron excess of 40 mole % will permit the use of a smaller amount of endo-cis-bicyclo-(2,2,1)-5-heptene-2,3-dicarboxylic acid, making it difficult to obtain improved resistance to weather as intended by this invention and impairing the physical properties of the resulting cured product. Thus amounts outside the foregoing range is objectionable. Further if less than 30 mole % of endo-cisbicyclo-(2,2,1)-5-heptene-2,3-dicarboxylic acid is used, it is difficult to achieve excellent resistance to weather, but an amount more than 45 mole % will render the cured product impaired in physical properties as in adhesion and bending properties, hence objectionable. On the other hand, if more than 55 mole % of at least one of aromatic dicarboxylic acid and/or saturated aliphatic dicarboxylic acid is used, the proportions of unsaturated dicarboxylic acid and endo-cis-dicyclo-(2,2,1)-5-heptene-2,3-dicarboxylic acid will be lowered, rendering it difficult to give excellent resistance to weather as intended by this invention and impairing curing properties, but an amount less than 15 mole % impairs weather resistance of the cured unsaturated polyester resin. Preferable proporation of acid components is in the range of 30 to 40 mole % of endo-cis-bicyclo-(2,2,1)-5-heptene-2,3-dicarboxylic acid, 25 to 35 mole % of unsaturated dicarboxylic acid, and 30 to 40 mole % of aromatic dicarboxylic acid and/or saturated aliphatic dicarboxylic acid.

The ratio of the acid component to polyhydric alcohol in preparing the unsaturated polyester according to the present invention is 1.0 mole : 1.0 to 1.2 moles. An amount of the alcohol component that is smaller than 1.0 mole per 1.0 mole of the acid component is undesirable since the resulting unsaturated polyester will then have a higher acid value and lower molecular weight with the result of lower weather resistance and lower curing properties, while an amount thereof in excess of 1.2 moles per 1.0 mole of the acid component is likewise objectionable because such amount permits an excess amount of hydroxyl group to remain in the unsaturated polyester and decreases the molecular weight of the resin, resulting in poor properties with respect to resistance to weather, curing properties, resistance to water, etc.

The unsaturated polyester used in this invention is obtained by subjecting the starting materials to condensation polymerization by usual method to such an extent that the acid value of the resulting unsaturated polyester is from 4 to 11. If the acid value of the unsaturated polyester becomes lower than 4, the reaction system will gel and the desired unsaturated polyester will not be obtained, wherea if it exceeds 11, the molecular weight of the unsaturated polyester obtained will inevitably be reduced and a cured product of high resistance to weather can not be prepared. It is therefore impossible to obtain a cured product of excellent resistance to weather. The unsaturated polyester may be one modified with a monobasic acid insofar as the acid value thereof is within the range of 4 to 11. For example, drying property of the unsaturated polyester is further improved by modification with unsaturated higher fatty acids having 16 to 18 carbon atoms. Such fatty acids are, for example, linseed oil, soybean oil, dehydrated caster oil, safflower oil, rice oil and like drying oils, fatty acids thereof, and tall oil fatty acids.

The unsaturated polyester composition used in this invention is prepared by dissolving the unsaturated polyester in the foregoing monomer mixture. The composition may preferably contain the unsaturated polyester in the concentration of 40 to 80% by weight. In order to render the present composition more preservable, it is possible to add thereto a polymerization inhibitor such as p-benzoquinone, hydroquinone, p-t-butylcatechol, diphenylbenzoquinone, butylhydroquinone, etc. Where necessary, it is possible to add a pigment, filler and like additives to the composition.

The unsaturated polyester composition of this invention can be used for molding, lamination, coating and like purposes. Especially when used as a coating composition, it gives an outstanding cured surface.

According to the present invention it is essential to subject the unsaturated polyester composition to irradiation of electron beam, whereby it displays excellent surface curability and gives a cured product having excellent weather resistance. Other curing methods in which heat, light and/or catalyst are used are ineffective for the present unsaturated polyester composition and fail to give such excellent cured product as obtained by the present invention.

The electron beam to be employed in order to cure the composition according to the present invention is applied at a total dose of from 0.5 to 50 Mrad, preferably from 5 to 25 Mrad and a dose rate of from 0.1 to 30 Mrad per second, preferably, from 0.5 to 10 Mrad per second. Example of the electron beam source is an electron accelerator.

For a better understanding of the invention examples are given below, in which all parts are by weight.

EXAMPLE 1

Three moles of fumaric acid, 2 moles of phthalic anhydride, 2 moles of adipic acid, 3 moles of endo-cis-bicyclo-(2,2,1)-5-heptene-2,3-dicarboxylic acid, 10 moles of neopentyl glycol and 1 mole of trimethylol propane were sbujected to condensation reaction in a nitrogen gas atmosphere at 200°C for 17 hours, whereby unsaturated polyester having an acid value of 8.5 was obtained.

The unsaturated polyester was then dissolved to a polymer concentration of 70 weight % in a monomer mixture consisting of styrene, methyl methacrylate and butyl acrylate in the ratio by weight of 50 : 8 : 42, whereby varnish (Varnish-A) was obtained.

To 100 parts of the varnish prepared as above were added 100 parts of titanium dioxide of the rutile type and 25 parts of the above monomer mixture, and the resultant mixture was dispersed in a paint conditioner to obtain white enamel. The resultant enamel was applied to a plate of ABS resin (acrylonitrile-butadiene-styrene resin) to a thickness of about 25 microns. The coating was irradiated and cured with electron-beam by a Van de Graaff accelerator at a dose of about 12 Mrad and a dose rate of about 0.5 Mrad per second using electron-beam energy of 800 KV and electron-beam current of 150 $\mu$A.

Comparative Example 1-1

White enamel was prepared from the Varnish-A in the same manner as in Example 1. One part of diemthyl phthalate solution containing 60 weight % methyl ethyl ketone peroxide and 0.5 part of cobalt naphthenate (xylene solution containing 6.25 weight % of metal cobalt) were added to 100 parts of the white enamel obtained as above. The resulting mixture was then applied to an ABS plate in the same manner as in Example 1 and the coating was left to stand at 20°C for four days for curing.

Comparative Example 1-2

White enamel was prepared from the Varnish-A in the same manner as in Example 1. One part of benzoin ethyl ether and 0.05 part of solid paraffin having a melting point of 62°C were added to 100 parts of the white enamel obtained as above. The resulting mixture was then applied to an ABS plate in the same manner as in Example 1 and the coating was irradiated with a high-pressure mercury lamp of 400 W for 3 minutes at 40 cm distant from the coating.

EXAMPLE 2

3.5 moles of fumaric acid, 3 moles of endo-cisbicyclo-(2,2,1)-5-heptene-2,3-dicarboxylic anhydride, 3.5 moles of phthalic anhydride, 2 moles of ethylene glycol, 8 moles of neopentyl glycol and 2 moles of trimethylol propane were subjected to condensation polymerization in the same manner as in Example 1, whereby unsaturated polyester having an acid value of 4 was obtained.

The resultant unsaturated polyester was dissolved in the same monomer mixture as in Example 1 to produce a varnish (Varnish-B) having a polymer concentration of 70 weight %.

To 100 parts of the Varnish-B were added 100 parts of rutile-type titanium dioxide and 20 parts of the monomer mixture disclosed in Example 1, and the resultant mixture was dispersed in a paint conditioner to obtain white enamel. The white enamel was then applied to a-0.8 mm-thick, surface-treated steel plate to a thickness of about 30 microns. The coating was irradiated and cured with electron-beam at a dose of about 10 Mrad using an electron-beam accelerator 300 KV.

Comparative Example 2-1

White enamel was prepared from the Varnish-B in the same manner as in Example 2. Polymerization initiators were added to the white enamel in the same manner as in Comparative Example 1 and the mixture was applied to a steel plate in the same manner as in Example 4 to prepare a coating and the coating was left to stand at 20°C for 4 days for curing.

Comparative Example 2-2

White enamel was prepared from the Varnish-B in the same manner as in Example 2. One part of benzoin ethyl ether and 0.05 part of solid paraffin having a melting point of 62°C were added to 100 parts of the white enamel obtained as above. The resulting mixture was then applied to a steel plate in the same manner as in Example 2 and the coating was irradiated with a high-pressure mercury lamp of 400 W for 3 minutes at 40 EXAMPLE distant from the coating.

Example 3

3 moles of maleic anhydride, 1.5 moles of endocis-bicyclo-(2,2,1)-5-heptene-2,3-dicarboxylic acid, 1.5 moles of endo-cis-bicyclo-(2,2,1)-5-heptene-2,3-dicarboxylic anhydride, 2 moles of phthalic anhydride, 2 moles of adipic acid, 2 moles of soybean oil fatty acid, 10 moles of neopentyl glycol and 2 moles of trimethylol propane were subjected to condensation polymerization in the same manner as in Example 1, whereby unsaturated polyester having an acid value of 9.6 was obtained.

The resultant unsaturated polyester was dissolved in the same monomer mixture as in Example 1 to produce a varnish (Varnish-C) having a polymer concentration of 70 weight %.

To 200 part of the Varnish-C were added 100 parts of red iron oxide and 40 parts of the same monomer mixture as in Example 1, and the resultant mixture was dispersed in a paint conditioner to obtain red enamel. The red enamel was then applied to a 0.8 mm-thick, surface-treated steel plate to a thickness about 30 microns. The coating was irradiated and cured with electron-beam at a dose of about 10 Mrad using an electron-beam accelerator of 300 KV.

Comparative Example 3-1

Red enamel was prepared from the Varnish-C in the same manner as in Example 3, and to the enamel were added polymerization initiators in the same manner as in Comparative Example 1-1. The mixture was applied to a steel plate in the same manner as in Example 3 to prepare a coating and the coating was left to stand at 20°C for four days for curing.

Comparative Example 3-2

Red enamel was prepared from the Varnish-C in the same manner as in Example 3. One part of benzoin ethyl ether and 0.05 part of solid paraffin having a melting point of 62°C were added to 100 parts of the red enamel obtained as above. The resulting mixture was then applied to a steel plate in the same manner as in Example 3 and the coating was irradiated with a high-pressure mercury lamp of 400 W for 3 minutes at 40 cm distant from the coating.

EXAMPLE 4

3.5 moles of maleic anhydride, 3.5 moles of endo-cis-bicyclo-(2,2,1)-5-heptene-2,3-dicarboxylic anhydride, 2.5 moles of phthalic anhydride, 0.5 mole of adipic acid and 12 moles of neopentyl glycol were subjected to condensation polymerization in the same manner as in Example 1, whereby unsaturated polyester having an acid value of 5.5 was obtained.

The resultant unsaturated polyester was dissolved in the same monomer mixture as in Example 1 to produce a varnish (Varnish-D) having a polymer concentration of 70 weight %.

To 200 parts of the Varnish-D were added 200 parts of rutile-type titanium dioxide and 50 parts of the same monomer mixture as in Example 1, and the resultant mixture was dispersed in a ball mill to obtain white enamel. The white enamel was then applied to a 0.8 mm-thick, pre-coated, surface-treated steel plate to a thickness of about 30 microns. The coating was irradiated and cured with electron-beam at a dose of 10 Mrad using an electron-beam accelerator of 300 KV.

Comparative Example 4-1

White enamel was prepared from the Varnish-D in the same manner as in Example 4, and to the enamel were added polymerization initiators in the same manner as in Comparative Example 1-1. The mixture was applied to a steel plate in the same manner as in Example 4 to prepare a coating and the coating was left to stand at 20°C for four days for curing.

Comparative Example 4-2

White enamel was prepared from the Varnish-D in the same manner as in Example 4. One part of benzoin ethyl ether and 0.05 part of solid paraffin having a melting point of 62°C were added to 100 parts of the white enamel obtained as above. The resulting mixture was then applied to a steel plate in the same manner as in Example 4 and the coating was irradiated with a high-pressure mercury lamp of 400 W for 3 minutes at 40 cm distant from the coating.

EXAMPLE 5

2.5 moles of fumaric acid, 4.0 moles of endocis-bicyclo-(2,2,1)-5-heptene-2,3-dicarboxylic acid, 2 moles of phthalic anhydride, 1.5 moles of adipic acid, 11 moles of neopentyl glycol and 1 mole of trimethylol propane were subjected to condensation polymerization in the same manner as in Example 1, whereby unsaturated polyester having an acid value of 10 was obtained.

The resultant unsaturated polyester was dissolved in the same monomer mixture as in Example 1 to produce a varnish (Varnish-E) having a polymer concentration of 70 weight %.

To 200 parts of the Varnish-E were added 200 parts of rutile-type titanium dioxide and 60 parts of the same monomer mixture as in Example 1, and the resultant mixture was dispersed in a ball mill to obtain white enamel. The white enamel was then applied to a 0.27 mm-thick, surface-treated, galvanized iron plate to a thickness of about 20 microns. The coating was irradiated and cured with electron-beam at a dose of 13 Mrad using an electron-beam accelerator of 300 KV.

Comparative Example 5-1

White enamel was prepared from the Varnish-E in the same manner as in Example 5, and to the enamel were added polymerization initiators in the same manner as in Comparative Example 1-1. The mixture was then applied to a steel plate in the same manner as in Example 5 to prepare a coating and the coating was left to stand at 20°C for four days for curing.

Comparative Example 5-2

White enamel was prepared from the Varnish-E in the same manner as in Example 5. One part of benzoin ethyl ether and 0.05 part of solid paraffin having a melting point of 62°C were added to 100 parts of the white enamel obtained as above. The resulting mixture was then applied to a steel plate in the same manner as in Example 5 and the coating was irradiated with a high-pressure mercury lamp of 400 W for 3 minutes at 40 cm distant from the coating.

EXAMPLE 6

5 moles of fumaric acid, 3.5 moles of endo-cisbicyclo-(2,2,1)-5-heptene-2,3-dicarboxylic acid, 1.5 moles of phthalic anhydride, 3 moles of diethylene glycol, 7 moles of neopentyl glycol and 1 mole of trimethylol propane were subjected to condensation polymerization in the same manner as in Example 1, whereby unsaturated polyester having an acid value of 6.7 was obtained.

The resultant unsaturated polyester was dissolved in the same monomer mixture as in Example 1 to produce a varnish (Varnish-F) having a polymer concentration of 70 weight %.

To 200 parts of the Varnish-F were added 10 parts of Phthalocyanine Blue, 30 parts of rutile-type titanium dioxide and 60 parts of the same monomer mixture as in Example 1, and the resultant mixture was dispersed in a ball mill to obtain blue enamel. The blue enamel was then applied to a 0.27 mm-thick, surface-treated, galvanized iron plate to a thickness of about 15 microns. The coating was irradiated and cured with electron-beam at a dose of about 8 Mrad using an electron-beam accelerator of 300 KV.

Comparative Example 6-1

Blue enamel was prepared from the Varnish-F in the same manner as in Example 6, and to the enamel were added polymerization initiators in the same manner as in Comparative Example 1-1. The mixture was applied to an iron plate to prepare a coating in the same manner as in Example 6. The coating was left to stand at 20°C for four days for curing.

Comparative Example 6-2

Blue enamel was prepared from the Varnish-F in the same manner as Example 6. One part of benzoin ethyl ether and 0.05 part of solid paraffin having a melting point of 62°C were added to 100 parts of the blue enamel obtained as above. The resulting mixture was then applied to an iron plate in the same manner as in Example 6 and the coating was irradiated with a high-pressure mercury lamp of 400 W for 3 minutes at 40 cm distant from the coating.

EXAMPLE 7 TO 14

The unsaturated polyester obtained according to Example 1 was dissolved in the monomer mixture given in Table 1 below to prepare eight kinds of varnishes, Varnishes G to N, having polymer concentrations shown in Table 1.

Table 1

| Vinyl monomers (wt.%) | 7 | 8 | 9 | Example 10 | 11 | 12 | 13 | 14 |
|---|---|---|---|---|---|---|---|---|
| Styrene | 30 | | 30 | 45 | 50 | | 55 | 60 |
| Vinyl toluene | | 35 | 10 | | | 50 | | |
| Ethyl acrylate | 20 | | | 45 | | | | |
| N-butyl acrylate | | 35 | | | 50 | | 25 | |
| 2-Ethylhexyl acrylate | | | 10 | | | | | |
| Methyl methacrylate | | 30 | | | | 50 | | |

Table 1-continued

| Vinyl monomers (wt.%) | 7 | 8 | 9 | Example 10 | 11 | 12 | 13 | 14 |
|---|---|---|---|---|---|---|---|---|
| Ethyl methacrylate | | | 30 | | | | | |
| N-butyl methacrylate | 50 | | | | | | 20 | |
| Iso-butyl methacrylate | | | | | | | | 40 |
| Divinylbenzene | | | 20 | | | | | |
| Trimethylolpropane trimethacrylate | | | | | 10 | | | |
| Polymerconcentration (%) | 55 | 55 | 50 | 50 | 60 | 60 | 55 | 55 |
| Varnish | G | H | I | J | K | L | M | N |

To 200 parts of each of the Varnishes-G to N was added 100 parts of rutile-type titanium dioxide and the mixture was dispersed in a paint conditioner to obtain white enamels. Each white enamel was then applied to an ABS plate to a thickness of about 25 microns. The coating was irradiated and cured with electron-beam at a dose of 13 Mrad using an electron-beam accelerator of 300 KV.

Comparative Examples 7 to 14

Eight kinds of white enamels were prepared from each of the Varnishes-G to N in the same manner as in Examples 7 to 14, and to the enamels were added polymerization initiators in the same manner as in Comparative Example 1-1. The resultant mixtures were respectively applied to an ABS plate in the same manner as in Examples 7 to 14. The coating was left to stand at 20°C for four days to obtain a cured coating.

Moreover, ten kinds of comparative varnishes were prepared using unsaturated polyesters produced from the materials shown in Table 2 below. The polymerization conditions were the same as in Example 1. Each of the unsaturated polyesters obtained was dissolved in the same monomer mixture as in Example 1 to prepare comparative varnishes a to j having a polymer concentration of 70 weight %, following the procedure as in Example 1.

Table 2

| Starting materials (mole) | a | b | c | Comparative Varnishes d | e | f | g | h | i | j |
|---|---|---|---|---|---|---|---|---|---|---|
| Maleic anhydride | | 4.5 | | | | | | | 4 | 2 |
| Fumaric acid | 3 | | 6 | | | | | 3 | | |
| Tetrahydrophthalic anhydride | | | | 3 | 4.5 | 6 | | 3 | 4.5 | 2.5 |
| Phthalic anhydride | 4.5 | 3.5 | 4 | 3.5 | 3.5 | 4 | 8.5 | 4 | 1.5 | 5.5 |
| Adipic acid | 2.5 | 2 | | 3.5 | 2 | | 1.5 | | | |
| Linseed oil fatty acid | | | | 1 | | | | | | |
| Soybean oil fatty acid | | | | | 2 | | | | | |
| Ethylene glycol | | | 2 | 3 | | | | 10.5 | | |
| Diethylene glycol | 2 | | | 8 | | | | | 3 | 3 |
| Neopentyl glycol | 8 | 10 | 8 | | 10 | 12 | 11 | | 7 | 7 |
| Trimethylolpropane | | 1 | 2 | | 2 | | 1 | | 1 | 1 |
| Acid value of resin | 9.5 | 10.8 | 4 | 8.5 | 9.8 | 5.7 | 10.3 | 7.2 | 6.2 | 6.5 |

Using the above comparative varnishes a to j, the following Comparative Examples were conducted.

Comparative Example 15

To 100 parts of the Comparative Varnish-a were added 100 parts of rutile-type titanium dioxide and 30 parts of the same monomer mixture as in Example 1, and the resultant mixture was dispersed in a ball mill to obtain white enamel. The white enamel was then applied to an ABS plate to a thickness of about 25 microns. The coating was irradiated and cured at a dose of 15 Mrad using an electron-beam accelerator of 300 KV.

Comparative Example 16

To 100 parts of the Comparative Varnish-b were added 80 parts of rutile-type titanium dioxide and 20 parts of the same monomer mixture as in Example 1, and the resultant mixture was dispersed in a paint conditioner to obtain white enamel. The white enamel was then applied to a 0.8 mm-thick, pre-coated and surface-treated steel plate to a thickness of about 30 microns. The coating was irradiated and cured with electron-beam at a dose of 10 Mrad using an electron-beam accelerator of 300 KV.

Comparative Example 17

To 100 parts of the Comparative Varnish-c were added 100 parts of rutile-type titanium dioxide and 20 parts of the same monomer mixture as in Example 1, and the resultant mixture was dispersed in a paint conditioner to obtain white enamel. The white enamel was then applied to a 0.8 mm thick, surface-treated steel plate to a thickness of 30 microns. The coating was irradiated and cured with electron-beam at a dose of about 10 Mrad using an alectron-beam accelerator of 300 KV.

Comparative Example 18

To 100 parts of the Comparative Varnish-d were added 3 parts of carbon black and 30 parts of the same monomer mixture as in Example 1, and the resultant mixture was dispersed in a paint conditioner to obtain black enamel. The black enamel was then applied to a 0.27 mm-thick, surface-treated, galvanized iron plate to a thickness of about 20 microns. The coating was irradiated and cured with electron-beam at a dose of about 15 Mrad using an electron-beam accelerator of 300 KV.

Comparative Example 19

To 200 parts of the Comparative Varnish-e were added 100 parts of red iron oxide and 40 parts of the same monomer mixture as in Example 1, and the resultant mixture was dispersed in a paint conditioner to obtain red enamel. The red enamel was then applied to a 0.8 mm-thick, surface-treated steel plate to a thickness of about 30 microns. The coating was irradiated and cured with electron-beam at a dose of about 12 Mrad using an electron-beam accelerator of 300 KV.

Comparative Example 20

To 200 parts of the Comparative Varnish-f wre added 200 parts of rutile-type titanium dioxide and 50 parts of the same monomer mixture as in Example 1, and the resultant mixture was dispersed in a ball mill to obtain white enamel. The white enamel was then applied to a 0.8 mm-thick, surface-treated steel plate to a thickness of about 30 microns. The coating was irradiated and cured with electron-beam at a dose of about 12 Mrad using an electron-beam accelerator of 300 KV.

Comparative Example 21

To 100 parts of the Comparative Varnish-g were added 100 parts of rutile-type titanium dioxide and 30 parts of the same monomer mixture as in Example 1, and the resultant mixture was dispersed in a ball mill to obtain white enamel. The white enamel was then applied to a 0.27 mm-thick, surface-treated, galvanized iron plate to a thickness of about 20 microns. The coating was irradiated and cured with electron-beam at a dose of 13 Mrad using an electron-beam accelerator of 300 KV.

Comparative Example 22

To 100 parts of the Comparative Varnish-h were added 10 parts of Phthalocyanine Green and 30 parts of the same monomer mixture as in Example 1, and the resultant mixture was dispersed in a paint conditioner to obtain green enamel. The green enamel was then applied to a 0.27 mm-thick, surface-treated, galvanized iron plate to a thickness of about 15 microns. The coating was irradiated at a dose of about 12 Mrad using an electron-beam accelerator of 300 KV.

Comparative Example 23

To 100 parts of the Comparative Varnsh-i were added 15 parts of rutile-type titanium dioxide, 5 parts of Phthalocyanine Blue and 30 parts of the same monomer mixture an in Example 1, and the resultant mixture was dispersed in a ball mill to obtain blue enamel. The blue enamel was then applied to a 0.27 mm-thick, surface-treated, galvanized iron plate to a thickness of about 15 microns. The coating was irradiated and cured with electron-beam at a dose of 8 Mrad using an electron-beam accelerator of 300 KV.

Comparative Example 24

To 100 parts of the Comparative Varnish-j were added 15 parts of rutile-type titanium dioxide, 5 parts of Phthalocyanine Blue and 30 parts of the same monomer mixture as in Example 1, and the resultant mixture was dispersed in a ball mill to obtain blue enamel. The blue enamel was then applied to a 0.27 mm-thick, surface-treated, galvanized iron plate to a thickness of about 15 microns. The coating was irradiated and cured with electron-beam at a dose of 10 Mrad using an electron-beam accelerator of 300 KV.

Comparative Example 25

The unsaturated polyester containing 20 moles percent (against the acid reactant) of endo-cis-bicyclo-(2,2,1)-5-heptene-2,3-dicarboxylic acid was produced from 3.5 moles of fumaric acid, 2.5 moles of phthalic anhydride, 2 moles of adipic acid, 2 moles of endo-cis-bicyclo-(2,2,1)-5-heptene-2,3-dicarboxylic acid, 10 moles of neopentyl glycol and 1 mole of trimethylol propane. The polymerization conditions were the same as in Example 1.

The unsaturated polyester obtained was dissolved in the same monomer mixture as in Example 1 to prepare comparative varnish-k having a polymer concentration of 70 weight %.

To 100 parts of the varnish prepared as above were added 100 parts of titanium dioxide of the rutile type and 25 parts of the above monomer mixture, and the resultant mixture was dispersed in a paint conditioner to obtain white enamel. The resultant enamel was applied to a plate of ABS resin (acrylo-nitrile-butadiene-styrene resin) to a thickness of about 25 microns. The coating was irradiated and cured with electron-beam at a dose of about 10 Mrad using electron-beam accelerator of 300 KV.

The cured coatings obtained in the Examples and Comparative Examples were subjected to outdoor weathering test according to ASTM D1014-66(45 deg) and D1535-69 (45 deg) to determine changes in gloss of the surfaces of the coatings during the test. The results are set forth in Table 3. The determination of gloss was conducted according to ASTM D1471-69.

Table 3

| Example | Varnish | Curing Method | Pigment | Before weathering | Resistance to weather (weathering test) 60° gloss value | | | | |
|---|---|---|---|---|---|---|---|---|---|
| | | | | | 6 months | 12 months | 18 months | 24 months | 30 months |
| 1 | A | E.B. *1 | Titanium dioxide | 92 | 89 | 88 | 85 | 84 | 83 |
| Comp.1-1 | A | P.O. *2 | do. | 87 | 80 | 58 | 47 | 44 | 42 |
| Comp.1-2 | A | L.C. *3 | do. | 83 | 75 | 58 | 45 | 40 | 35 |
| 2 | B | E.B. | Titanium dioxide | 93 | 90 | 88 | 84 | 79 | 78 |
| Comp.2-1 | B | P.O. | do. | 89 | 81 | 60 | 47 | 43 | 40 |
| Comp.2-2 | B | L.C. | do. | 87 | 79 | 58 | 46 | 40 | — |
| 3 | C | E.B. | Red iron oxide | 88 | 87 | 85 | 80 | 76 | 72 |
| Comp.3-1 | C | P.O. | do. | 87 | 80 | 54 | 44 | 40 | 37 |
| Comp.3-2 | C | L.C. | do. | 87 | 79 | 54 | 40 | 38 | 35 |
| 4 | D | E.B. | Titanium dioxide | 93 | 88 | 86 | 85 | 82 | 80 |
| Comp.4-1 | D | P.O. | do. | 90 | 81 | 60 | 50 | 45 | 42 |
| Comp.4-2 | D | L.C. | do. | 90 | 82 | 59 | 48 | 43 | 42 |
| 5 | E | E.B. | Titanium dioxide | 90 | 88 | 87 | 84 | 82 | 78 |
| Comp.5-1 | E | P.O. | do | 87 | 80 | 61 | 47 | 41 | 37 |
| Comp.5-2 | E | L.C. | do. | 86 | 80 | 59 | 46 | 41 | 36 |
| 6 | F | E.B. | Titanium dioxide and phthalocyanine blue | 90 | 88 | 84 | 82 | 80 | 78 |
| Comp.6-1 | F | P.O. | do. | 91 | 81 | 62 | 45 | 42 | 40 |
| Comp.6-2 | F | L.C. | do. | 90 | 80 | 61 | 43 | 41 | 39 |
| 7 | G | E.B. | Titanium dioxide | 90 | 89 | 87 | 84 | 83 | 80 |
| Comp. 7 | G | P.O. | do. | 90 | 82 | 60 | 49 | 42 | 40 |
| 8 | H | E.B. | Titanium dioxide | 92 | 88 | 86 | 85 | 83 | 78 |
| Comp. 8 | H | P.O. | do. | 92 | 80 | 58 | 45 | 44 | 41 |
| 9 | I | E.B. | Titanium dioxide | 90 | 87 | 84 | 82 | 80 | 78 |
| Comp. 9 | I | P.O. | do. | 91 | 79 | 52 | 48 | 40 | 38 |
| 10 | J | E.B. | Titanium dioxide | 88 | 85 | 83 | 82 | 79 | 76 |
| Comp. 10 | J | P.O. | do. | 87 | 81 | 51 | 44 | 41 | 36 |
| 11 | K | E.B. | Titanium dioxide | 91 | 87 | 86 | 85 | 82 | 79 |
| Comp. 11 | K | P.O. | do. | 90 | 83 | 61 | 49 | 45 | 42 |
| 12 | L | E.B. | Titanium dioxide | 89 | 86 | 84 | 82 | 81 | 77 |
| Comp. 12 | L | P.O. | do. | 91 | 80 | 53 | 46 | 41 | 39 |
| 13 | M | E.B. | Titanium dioxide | 94 | 90 | 87 | 85 | 83 | 80 |
| Comp. 13 | M | P.O. | do | 93 | 82 | 60 | 47 | 42 | 41 |
| 14 | N | E.B. | Titanium dioxide | 92 | 88 | 86 | 84 | 83 | 80 |
| Comp. 14 | N | P.O. | do. | 91 | 79 | 54 | 46 | 42 | 42 |
| Comp. 15 | Comp.v.-a | E.B. | Titanium dioxide | 90 | 81 | 75 | 60 | 55 | 45 |
| Comp. 16 | Comp.v.-b | do. | Titanium dioxide | 89 | 80 | 74 | 61 | 53 | 42 |
| Comp. 17 | Comp.v.-c | do. | Titanium dioxide | 91 | 83 | 71 | 62 | 54 | 41 |
| Comp. 18 | Comp.v.-d | E.B. | Carbon black | 85 | 70 | 51 | 42 | 37 | 31 |
| Comp. 19 | Comp.v.-e | do. | Red iron oxide | 87 | 68 | 52 | 42 | 36 | 33 |
| Comp. 20 | Comp.v.-f | do. | Titanium dioxide | 90 | 70 | 53 | 43 | 35 | 32 |
| Comp. 21 | Comp.v.-g | do. | Titanium dioxide | 88 | 50 | 42 | 30 | — | — |
| Comp. 22 | Comp.v.-h | do. | Phthalocyanine blue | 90 | 76 | 65 | 48 | 42 | 40 |
| Comp. 23 | Comp.v.-i | do. | Titanium dioxide phthalocyanine blue | 89 | 74 | 63 | 49 | 43 | 41 |
| Comp. 24 | Comp.v.-j | do. | Titanium dioxide phthalocyanine blue | 90 | 75 | 64 | 46 | 42 | 40 |
| Comp. 25 | Comp.v.-k | do. | Titanium dioxide | 90 | 87 | 70 | 63 | 58 | 50 |

Note:
*1 E.B. shows that the coating film was cured by irradiation of electron-beam.
*2 P.O. shows that the coating film was cured by polymerization initiators without irradiating electron-beam.
*3 L.C. shows that the coating film was cured by irradiation of light.

What we claim is:

1. A method for curing unsaturated polyester compositions which comprises applying electron-beam at a total dose of 0.5 to 50 Mrad and a dose rate of 0.1 to 30 Mrad per second to an unsaturated polyester composition comprising a vinyl monomer and unsaturated polyester dissolved therein, said vinyl monomer being a mixture of 40 to 70 weight percent of at least one of acrylic and methacrylic monomers and 30 to 60 weight percent of at least one of styrene and vinyl toluene, and said unsaturated polyester having an acid value of 4 to 11 and being a condensation product of 1.0 mole of a dicarboxylic acid and 1.0 to 1.2 moles of a polyhydric alcohol, and said dicarboxylic acid being a mixture of (a) 30 to 45 mole percent of at least one of endo-cis-bicyclo-(2,2,1)-5-heptene-2,3-dicarboxylic acid and anhydride thereof, (b) 20 to 40 mole percent of at least one of unsaturated dicarboxylic acids and anhydrides thereof and (c) 15 to 55 mole percent of at least one of aromatic dicarboxylic acids, saturated aliphatic dicarboxylic acids and anhydrides thereof.

2. A method for curing unsaturated polyester compositions according to claim 1, in which said electron-beam is applied at a total dose of 5 to 25 Mrad and a dose rate of 0.5 to 10 Mrad per second.

3. A method for curing unsaturated polyester compositions according to claim 1, in which said acrylic and methacrylic monomer is at least one of the compounds represented by the formula of

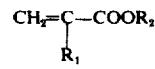

wherein $R_1$ is hydrogen atom or methyl group and $R_2$ is hydrogen atom, 2-hydroxyethyl, 2-hydroxypropyl group or alkyl group having 1 to 12 carbons.

4. A method for curing unsaturated polyester compositions according to claim 3, in which said acrylic and methacrylic monomer is at least one member selected from the group consisting of acrylic acid, methyl acrylate, ethyl acrylate, butyl acrylate, 2-hydroxyethyl acrylate, 2-hydroxyethyl methacrylate, 2-hydroxypropyl acrylate, 2-hydroxypropyl methacrylate, 2-ethylhexyl acrylate, methacrylic acid, methyl methacrylate, ethyl methacrylate, butyl methacrylate and lauryl methacrylate.

5. A method for curing unsaturated polyester compositions according to claim 1, in which said unsaturated dicarboxylic acid is at least one member selected from the group consisting of maleic acid, maleic anhydride, fumaric acid, mesaconic acid, citraconic acid, itaconic acid, tetrahydrophthalic acid and tetrahydrophthalic anhydride.

6. A method for curing unsaturated polyester compositions according to claim 1, in which said aromatic dicarboxylic acid and saturated aliphatic dicarboxylic acid is at least one member selected from the group consisting of phthalic acid, phthalic anhydride, isophthalic acid, hexahydrophthalic acid, hexahydrophthalic anhydride, adipic acid, sebacic acid, succinic acid and succinic anhydride.

7. A method for curing unsaturated polyester compositions according to claim 1, in which said polyhydric alcohol is a dihydric alcohol.

8. A method for curing unsaturated polyester compositions according to claim 7, in which said dihydric alcohol is at least one member selected from the group consisting of ethylene glycol, propylene glycol, diethylene glycol, butylene glycol, hydrogenated bisphenol A, bisphenol dihydroxypropylether, neopentyl glycol, butane diol and hexane diol.

9. A method for curing unsaturated polyester compositions according to claim 1, in which said polyhydric alcohol is a mixture of a dihydric alcohol and a trihydric alcohol.

10. A method for curing unsaturated polyester compositions according to claim 1, in which said dicarboxylic acid is mixture of (a) 30 to 40 mole percent of at least one of endo-cis-bicyclo-(2,2,1)-5-heptene-2,3-dicarboxylic acid and anhydride thereof, (b) 25 to 35 mole percent of at least one of unsaturated dicarboxylic acids and anhydrides thereof and (c) 30 to 40 mole percent of at least one of aromatic dicarboxylic acids, saturated aliphatic dicarboxylic acids and anhydrides thereof.

11. An electron-beam radiation curable unsaturated polyester composition which comprises a vinyl monomer and unsaturated polyester dissolved therein, said vinyl monomer being a mixture of 40 to 70 weight percent of at least one of acrylic and methacrylic monomers and 30 to 60 weight percent of at least one of styrene and vinyl toluene, and said unsaturated polyester having an acid value of 4 to 11 and being a condensation product of 1.0 mole of a dicarboxylic acid and 1.0 to 1.2 moles of a polyhydric alcohol, and said dicarboxylic acid being a mixture of (a) 30 to 45 mole percent of at least one of endo-cis-bicyclo-(2,2,1)-5-heptene-2,3-dicarboxylic acid and anhydride thereof, (b) 20 to 40 mole percent of at least one of unsaturated dicarboxylic acids and anhydrides thereof and (c) 15 to 55 mole percent of at least one of aromatic aliphatic dicarboxylic acids, saturated dicarboxylic acids and anhydrides thereof.

* * * * *